(12) United States Patent
Vargas Da Silva

(10) Patent No.: US 7,322,234 B2
(45) Date of Patent: Jan. 29, 2008

(54) WATERTIGHT FUEL-GAUGE HOUSING

(75) Inventor: Carlos Eduardo Vargas Da Silva, São Paulo (BR)

(73) Assignee: Indebrás Indústria Electromecânica Brasileira Ltda., Sao Paulo (BR)

( * ) Notice: Subject to any disclaimer, the term of this patent is extended or adjusted under 35 U.S.C. 154(b) by 0 days.

(21) Appl. No.: 11/343,363

(22) Filed: Jan. 31, 2006

(65) Prior Publication Data

US 2007/0175274 A1 Aug. 2, 2007

(51) Int. Cl.
G01F 23/00 (2006.01)
G01F 23/30 (2006.01)
G01F 23/32 (2006.01)
(52) U.S. Cl. .............................. 73/313; 73/317; 116/229
(58) Field of Classification Search .................. 73/313, 73/317, 305, 309, 314; 340/623, 625; 116/229, 116/228
See application file for complete search history.

(56) References Cited

U.S. PATENT DOCUMENTS 2,522,258 A * 9/1950 Fanshier ...................... 73/298
3,254,170 A * 5/1966 Hill ........................... 200/84 B
3,686,451 A * 8/1972 Pottharst, Jr. ............. 200/84 R
6,305,220 B1* 10/2001 Brunel ......................... 73/317

FOREIGN PATENT DOCUMENTS

DE 4010483 A1 * 10/1991

* cited by examiner

Primary Examiner—Daniel S. Larkin
Assistant Examiner—Tamiko Bellamy
(74) Attorney, Agent, or Firm—Frommer Lawrence & Haug LLP; Ronald R. Santucci

(57) ABSTRACT

A watertight fuel-gauge housing comprises a housing at least partially positioned in the interior of a fuel tank; a gauge mechanism within said housing for providing an indication of the level of fuel within said tank according to the position of a floating device connected to a shaft that penetrates the housing; and a sealing assembly for sealing the opening through which said shaft penetrates the housing, the sealing assembly comprising a rotatably movable sealing washer and a mounting packing tightly positioned within a seat formed around the opening of the housing through which said shaft projects.

9 Claims, 1 Drawing Sheet

WATERTIGHT FUEL-GAUGE HOUSING

BACKGROUND OF THE INVENTION

1. Field of the Invention

The present invention refers to a sealing assembly for a watertight fuel-gauge housing, more specifically to an improved, more efficient fuel-gauge housing for use in the automobile industry particularly designed to better suit to the harsh conditions it is submitted to when in use.

2. Description of the Prior Art

Typically a watertight fuel-gauge for use with a motor vehicle comprises a housing designed to be at least partially positioned in the interior of the fuel tank, the housing being provided with mounting flanges that cooperates with matching mounting projections in the tank. A gauge mechanism is mounted within said housing, the mechanism comprising a resistor, a cursor acting upon said resistor, said cursor being one end of an arm which opposite end is fixedly mounted to a shaft to rotate therewith, one end of said shaft projecting through an opening formed on the housing and connecting to one end of a rod which opposite end has a floating device mounted thereto.

As the position of the floating device varies according to the level of the fuel within the tank, said rod is forced to rock, which rocking rotates the shaft within the housing, the arm attached thereto and, consequently, the cursor acting against the resistor, thereby providing an indication of the level of fuel within the tank.

The opening in the housing through which said shaft projects is covered with a sealing assembly, to provide a watertight gauge, said sealing assembly typically comprising one or more "O" shaped rings positioned on the inner perimeter of the opening through which said shaft projects.

Notwithstanding the wide use of watertight gauges having a construction as described above, this structure is not totally satisfactory because usually said "O" shaped rings do not have enough dimensional compatibility with the shaft. Typically said rings will have an inner diameter bigger than the outer diameter of the shafts, therefore allowing the fuel to leak into the interior of the housing which may damage the resistor/cursor mechanism. Also, the material of the rings may yield with time giving birth to the same problem. On the contrary, when the inner diameter of the rings is smaller than the outer diameter of the shafts, this may stop the rotating movement of the shafts thereby affecting the operation of the fuel-gauge.

Another serious problem with the above mentioned "O" shaped sealing rings generally used to seal the housing of a fuel-gauge having the above construction is that they inflate and expand in the presence of fuel and this may cause them to prevent the shafts from rotating and thereby affect the operation of the fuel-gauge.

SUMMARY OF THE INVENTION

In view of the foregoing disadvantages inherent to the known types of sealing assemblies for watertight fuel-gauge housing of known designs and configurations now present in the prior art, the present invention provides an improved sealing assembly.

The sealing assembly for use in a watertight fuel-gauge according to the present invention was specially develop to overcome the above-discussed problems of the prior art.

The present invention provides a sealing assembly for a watertight fuel-gauge housing comprising a sealing washer and a mounting packing tightly positioned within a seat formed around the opening of said housing through which said shaft projects, said sealing washer having a central opening with an inner diameter slightly smaller than the outer diameter of said shaft to form a folded lip around the shaft when the washer is mounted thereupon, and being positioned between the bottom of the seat and the mounting packing.

This constructions solves the above-discussed problems related to the use of "O" shaped rings for sealing the housing of the fuel-gauge, as the folded lip of the washer positioned against the outer perimeter of the shaft provides an suitable seal while not preventing the shaft from rotating with the rod, whereby not affecting the operation of the fuel-gauge.

Additionally, the particular positioning of the folded lip of the sealing washer against the perimeter of the shaft allows it to stretch and axially slide around the shaft, should the washer inflate and expand because of contact with the fuel, instead of its internal edge acting radially against the shaft to immobilize it, as it usually occurs with the—"O" rings, thereby not causing a significant increase of the pressure around the shaft that could prevent the shaft from rotating.

BRIEF DESCRIPTION OF THE DRAWINGS

The sealing assembly for a watertight fuel-gauge housing according to the present invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
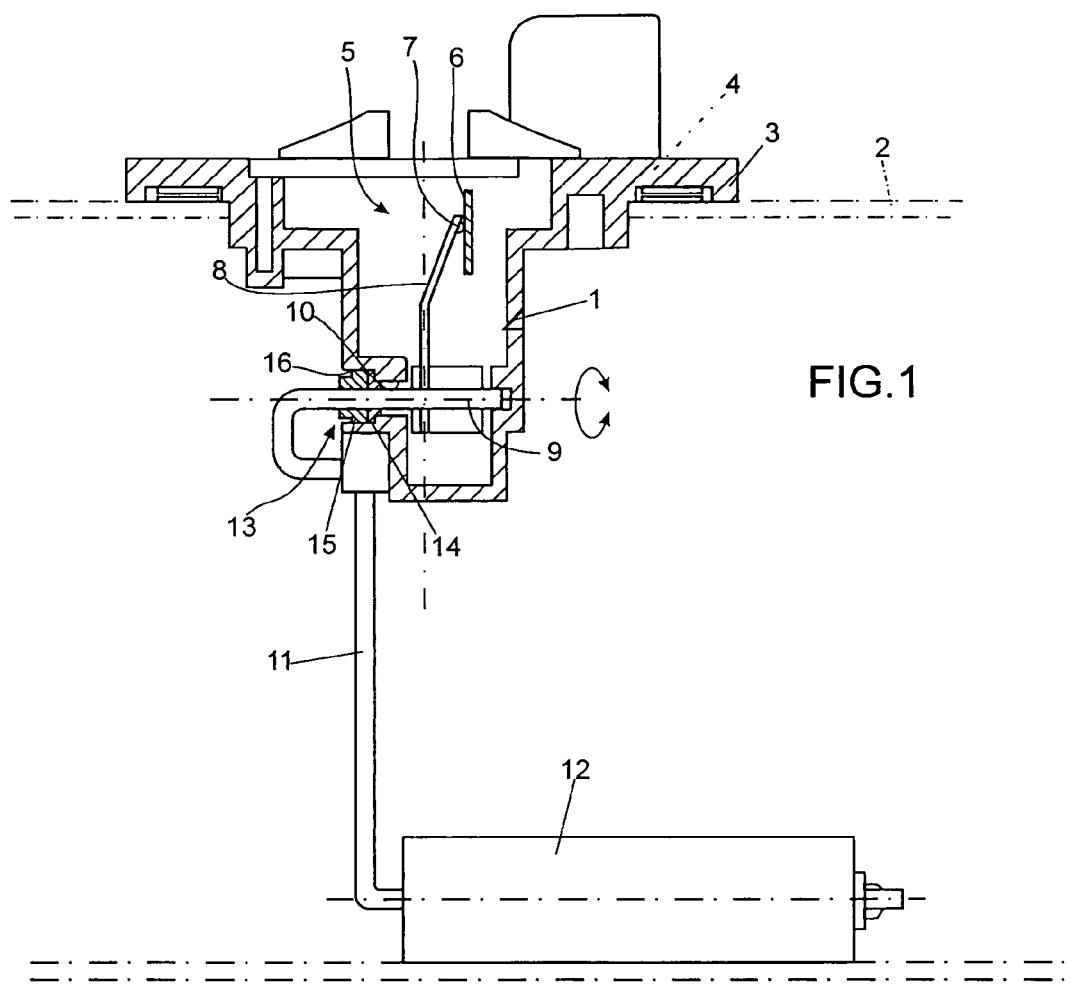
FIG. 1 is a cross-sectional view of the fuel-gauge according to the present invention mounted on a fuel tank.
Figure 2:
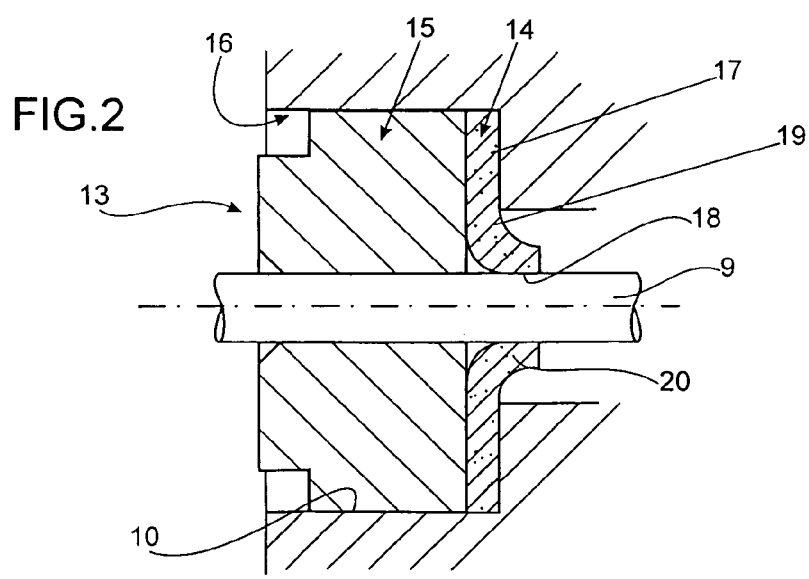
FIG. 2 is an enlarged view of the sealing assembly.

With reference now to the drawings, and in particular to FIG. 1 thereof, the preferred embodiment of the new and improved sealing assembly for a watertight fuel-gauge housing according to the present invention is shown as comprising a housing 1 mounted on a fuel tank 2 in such a manner that at least part of said housing is positioned in the interior of the tank, said housing 1 being provided with mounting flanges 3 that cooperate with matching mounting projections 4 formed on the outer surface of the tank.

A gauge mechanism 5 is mounted within the housing 1, said mechanism comprising a resistor 6 fixedly positioned within said housing to make contact with a movable cursor 7 that slides over said resistor 6, the sliding movement causing a floating in the final resistance of resistor 6.

Cursor 7 is one end of an arm 8 which opposite end is fixedly mounted to a shaft 9 to rotate therewith. Shaft 9 has one end rotatably mounted upon an inner wall of housing 1 and its opposite end projects through an opening 10 formed on the opposite wall of the housing to connect to one end of a rod 11.

A floating device 12 is mounted on the opposite end of said rod 11 to float according to the level of fuel in the interior of the tank, thereby causing said rod 11 to rock, which rocking rotates shaft 9 within the housing 1, the arm 8 attached thereto and, consequently, the cursor 7 sliding against resistor 6, this sliding movement causing a floating in the final resistance of resistor 6 and providing an indication of the level of fuel within the tank.

The sealing assembly 13 according to the present invention comprises a rotatably movable sealing washer 14 and a mounting packing 15 tightly positioned within a seat 16 formed around the opening 10 of the housing 1 through which one end of said shaft 9 projects.

The sealing washer 14 has a central opening 18 which inner diameter is slightly smaller than the outer diameter of said shaft 9, whereby it forms a folded lip 20 around the periphery of the shaft 9 when the washer 14 is mounted upon the shaft.

The peripheral region 17 of the sealing washer 14 is positioned against the bottom of the seat 16 and the mounting packing 15 is mounted thereupon tightly fixing to the side walls of seat 16, thereby maintaining the sealing washer 14 in position.

This arrangement of the sealing washer 14 and a mounting packing 15, the former laying adjacent to the bottom of the seat 16 formed around the opening 10 of the housing 1 and the latter fitting tightly against the side walls of seat 16 allow the sealing washer to freely rotate with the shaft 9 while being maintained in position by the mounting packing 15.

This constructions solves the problems related to the use of "O" rings for sealing the housing of the fuel-gauge, as the folded lip of the washer positioned against the outer perimeter of the shaft provides a suitable seal while not preventing the shaft from rotating with the rod, thereby not affecting the operation of the fuel-gauge.

Additionally, this particular positioning of the folded lip of the sealing washer against the perimeter of the shaft allows it to stretch and axially slide around the shaft, should the washer inflate and expand because of contact with the fuel, instead of its internal edge acting radially against the shaft to immobilize it, as it would occur with an "O" ring, thereby not increasing the pressure around the shaft that could prevent it from rotating.

The sealing washer 14 can be made of any suitable material used in sealing devices, preferably an elastomer, while mounting packing 15 is preferably made of brass.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A watertight fuel-gauge housing comprising:
   a housing at least partially positioned in the interior of a fuel tank;
   a gauge mechanism within said housing for providing an indication of the level of fuel within said tank according to the position of a floating device connected to a shaft that penetrates the housing; and
   a sealing assembly for sealing the opening through which said shaft penetrates the housing, the sealing assembly comprising a rotatably movable sealing washer and a mounting packing tightly positioned within a seat formed around the opening of the housing through which said shaft projects;
   wherein the rotatably movable sealing washer has a central opening with an inner diameter slightly smaller than the outer diameter of the shaft that forms a folded lip around the shaft when the washer is mounted upon the shaft.

2. The watertight fuel-gauge housing of claim 1, wherein the rotatably movable sealing washer is positioned adjacent to the bottom of the seat formed around the opening of the housing.

3. The watertight fuel-gauge housing of claim 1, wherein said mounting packing fitting tightly against the side walls of the seat formed around the opening of the housing.

4. The watertight fuel-gauge housing of claim 1, wherein said rotatably movable sealing washer is made of a suitable material used for sealing.

5. The watertight fuel-gauge housing of claim 4, wherein said rotatably movable sealing washer is made of elastomero.

6. The watertight fuel-gauge housing of claim 1, wherein said rotatably movable sealing washer is made of brass.

7. The watertight fuel-gauge housing of claim 1, wherein said gauge mechanism comprises a resistor fixedly positioned within said housing to make contact with a movable cursor slidable over said resistor to cause a fluctuation in the resistance of said resistor.

8. The watertight fuel-gauge housing of claim 7, wherein said cursor is one end of an arm which opposite end is fixedly mounted to a shaft to rotate therewith, said shaft having one end rotatably mounted upon an inner wall of the housing and its opposite end projecting through an opening formed on the opposite wall of the housing.

9. The watertight fuel-gauge housing of claim 8, wherein said end of said shaft projecting through the opening in the housing connects to one end of a rod which opposite end has a floating device mounted thereto.

* * * * *